United States Patent
Tuzi et al.

(10) Patent No.: US 11,107,002 B2
(45) Date of Patent: Aug. 31, 2021

(54) REINFORCEMENT LEARNING BASED GROUND VEHICLE CONTROL TECHNIQUES

(71) Applicant: Traxen Inc., Plymouth, MI (US)

(72) Inventors: Gerti Tuzi, Plymouth, MI (US); Ali Maleki, Plymouth, MI (US); Nabil H K Hirzallah, Plymouth, MI (US); Michael Makowski, Plymouth, MI (US); Naren Reddy Dhansri, Plymouth, MI (US)

(73) Assignee: Traxen Inc., Plymouth, MI (US)

( * ) Notice: Subject to any disclaimer, the term of this patent is extended or adjusted under 35 U.S.C. 154(b) by 128 days.

(21) Appl. No.: 16/355,657

(22) Filed: Mar. 15, 2019

(65) Prior Publication Data
US 2019/0378036 A1 Dec. 12, 2019

Related U.S. Application Data

(63) Continuation-in-part of application No. 16/289,638, filed on Feb. 28, 2019, now abandoned, and a continuation-in-part of application No. 16/212,108, filed on Dec. 6, 2018.

(60) Provisional application No. 62/683,188, filed on Jun. 11, 2018.

(51) Int. Cl.
*G06N 20/00* (2019.01)
*B60W 50/00* (2006.01)
*B60W 30/14* (2006.01)
*G06N 7/00* (2006.01)

(52) U.S. Cl.
CPC ............ *G06N 20/00* (2019.01); *B60W 30/14* (2013.01); *B60W 50/0097* (2013.01); *B60W 2050/0013* (2013.01); *B60W 2400/00* (2013.01)

(58) Field of Classification Search
USPC .......................................................... 701/98
See application file for complete search history.

(56) References Cited

U.S. PATENT DOCUMENTS

| | | | |
|---|---|---|---|
| 9,020,726 B2 | 4/2015 | Boeckenhoff et al. | |
| 10,725,467 B2* | 7/2020 | Meier | G05D 1/021 |
| 2012/0022764 A1* | 1/2012 | Tang | B60W 30/1882 |
| | | | 701/102 |
| 2014/0012479 A1* | 1/2014 | Zhao | B60W 10/04 |
| | | | 701/96 |
| 2017/0057517 A1* | 3/2017 | Huq | B60W 50/082 |
| 2018/0072157 A1 | 3/2018 | Koebler et al. | |
| 2019/0378042 A1* | 12/2019 | Tuzi | B60W 30/14 |

FOREIGN PATENT DOCUMENTS

DE 102016214045 2/2018

* cited by examiner

*Primary Examiner* — Tyler D Paige

(57) ABSTRACT

Reinforcement learning based ground vehicle control techniques adapted to reduce energy consumption, braking, shifting, travel distance, travel time, and or the like. The reinforcement learning techniques can include training a reinforcement learning controller based on a simulated ground vehicle environment during a simulation mode, and then further training the reinforcement learning controller based on a ground vehicle environment during an operating mode of a ground vehicle.

20 Claims, 12 Drawing Sheets

REINFORCEMENT LEARNING BASED GROUND VEHICLE CONTROL TECHNIQUES

CROSS-REFERENCE TO RELATED APPLICATIONS

This is a Continuation-in-Part of U.S. patent application Ser. No. 16/289,638 filed Feb. 28, 2019, a Continuation-in-Part of U.S. patent application Ser. No. 16/212,108 filed Dec. 6, 2018, and claims the benefit of U.S. Provisional Patent Application No. 62/683,188 filed Jun. 11, 2018, all of which are incorporated herein in their entirety.

BACKGROUND OF THE INVENTION

The operating costs of commercial vehicles include fuel, labor, equipment, insurance and the like. The fuel costs are the largest portion of the operating costs. The profit margin across the commercial truck industry is currently approximately 4.8%. Therefore, if operating costs, through fuel savings, can be reduced by just 5%, the net operating profit margins for a trucking company can be increased by 50%.

Generally, optimal energy efficiency can be obtained while cruising at a steady speed, at minimal throttle and with the transmission in the highest gear on a level roadway. However, the driving environment is highly dynamic and therefore ground vehicles cannot be operated at a steady state cruising speed, with minimal throttle input in the highest gear. Hills, curves, traffic, weather and the like will require the vehicle to operate at varying speeds, accelerating and braking, and changing between multiple gears. The driving environment and the skill of the given driver can have a significant impact on energy efficiency. Different drivers will also operate ground vehicles at different speeds, have different acceleration and braking patterns, and use different gears at different times. For example, two different drivers may operate substantially identical vehicles and maneuver along identical routes during identical traffic conditions. The first driver may operate the ground vehicle differently from the second driver. The first driver may, for example, apply the brakes significantly less than the second driver by coasting toward upcoming stops, in comparison to the second driver who may continue to drive toward the stop and abruptly apply the brakes upon reaching the stop. The different driving styles of the drivers can result in different overall energy utilization for the same trips.

Conventional, cruise control and adaptive cruise control systems can provide some increases in fuel economy. The cruise control and adaptive cruise control systems allow the driver to set the speed of the ground vehicle. Adaptive cruise control systems can also automatically adjust the vehicle speed by gradually braking and accelerating such that the ground vehicle maintains a specified distance from an impeding ground vehicle while operating at the set speed as much as possible. The set speed and controlled acceleration and braking of cruise control and adaptive cruise control systems typically provides some improved fuel efficiency in comparison to manual operation by the second type of driver. However, the driving style of the first driver may provide better energy efficiency than the cruise control and adaptive cruise control systems. Therefore, there is a continuing need for further energy economy techniques.

SUMMARY OF THE INVENTION

The present technology may best be understood by referring to the following description and accompanying drawings that are used to illustrate embodiments of the present technology directed toward reinforcement learning based ground vehicle control techniques.

In one embodiment, a reinforcement learning method can include training a reinforcement learning controller based on a simulated ground vehicle environment, during a simulation mode. The method can further include training the reinforcement learning controller based on a ground vehicle environment, during an operation mode of a ground vehicle. In addition, an action based on a current state of the ground vehicle environment utilizing the reinforcement learning controller can be output during the operating mode of the ground vehicle.

In another embodiment, a ground vehicle control system can include a plurality of sensors and a predictive enhanced cruise controller. The plurality of sensors can be configured to detect a plurality of ground vehicle operating parameters, driver control inputs, and one or more driving environment parameters, wherein the one or more driving environment parameters includes at least one predicted driving environment parameter. The predictive enhanced cruise controller can include a reinforcement learning controller configured to train the reinforcement learning controller based on a simulated ground vehicle environment, during a simulation mode. The reinforcement learning controller can be further configured to train the reinforcement learning controller based on a ground vehicle environment, during an operating mode of a ground vehicle.

The reinforcement learning based system and methods, in accordance with aspects of the present technology, can be utilized to optimize ground vehicle control techniques. The optimized ground control techniques can dynamically adjust the operation of the ground vehicle such that energy consumption is decreased.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
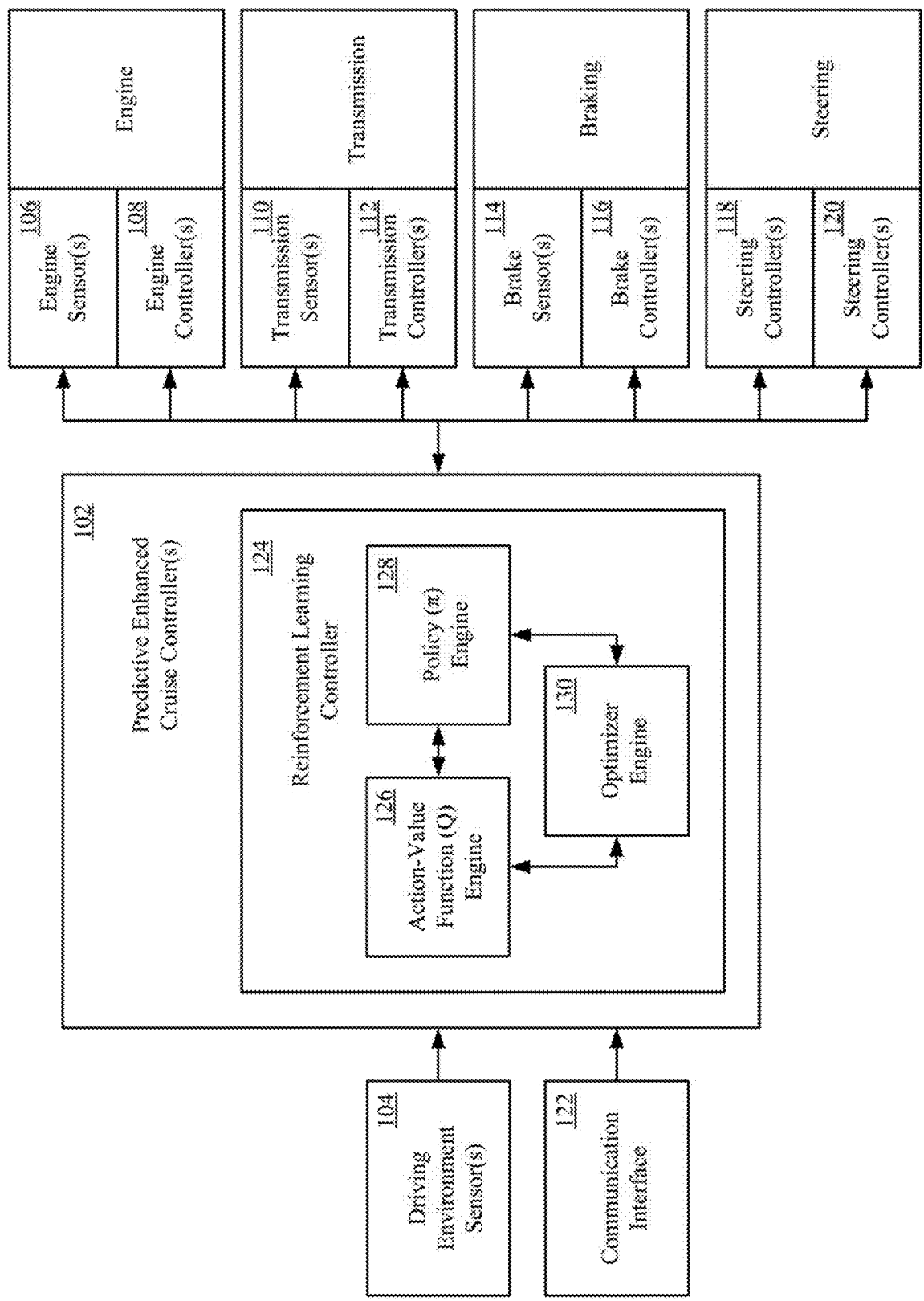
FIG. 1 shows a predictive enhanced cruise controller for use in a ground vehicle, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

As used herein, a ground vehicle includes a motorized vehicle with wheels that maneuvers along roadways. For example, ground vehicles can include, but are not limited to, semi-trucks, tractor-trailers, trucks, busses, motorhomes, automobiles, cars, motor cycles, recreational vehicles (RVs), all-terrain vehicles (ATVs), utility vehicles (UTVs), tractors and the like. As used herein, the term energy can include, but is not limited to, gasoline, diesel, propane, natural gas, ethanol, alcohol, electricity, solar, battery, hydrogen, and the like. As used herein, engines can include, but are not limited to, internal combustion engines, electric motors, and the like. As used herein, the term powertrain includes the mechanisms by which power is generated and transmitted to the roadway by the ground vehicle. As used herein, the term performance can include, but is not limited to, energy consumption, braking, shifting, travel time, travel distance, and or the like.

Referring now to FIG. 1, a predictive enhanced cruise controller for use in a ground vehicle, in accordance with aspects of the present technology, is shown. The predictive enhanced cruise controller 102 can be communicatively coupled to one or more driving environment sensors 104, one or more engine sensors 106 and or one or more engine controllers 108. The predictive enhanced controller 102 can also be communicatively coupled to one or more transmission sensors 110, one or more transmission controllers 112, one or more brake sensors 114, one or more brake controllers 116, one or more steering sensors 118, one or more steering controllers 120, and or other similar sensors and controllers. The predictive enhanced cruise controller 102 can also be communicatively coupled to one or more external networks through one or more communication interfaces 122.

In one implementation, the one or more predictive enhanced cruise controllers 102 and one or more of the sensors and controllers can be integral to the ground vehicle. The one or more predictive enhanced cruise controllers 102 can be implemented in hardware, firmware, software or any combination thereof. In other implementation, the one or more predictive enhanced controllers 102 can be implemented in a distributed computing architecture. For example, some functions of the predictive enhanced cruise controller can be implemented as computing device-executable instructions (e.g., computer program) that are stored in computing device-readable media (e.g., computer memory) and executed by a computing device (e.g., processor) on the ground vehicle. One or more other functions can be implemented on one or more other computing devices external to the ground vehicle. The one or more other functions can for example be implement in the cloud, on a remove server, or the like.

The engine sensors 106 and engine controllers 108 can include, but not limited to, Engine Control Modules (ECM), Engine Control Units (ECU), throttle position sensors, fuel injector sensors, intake sensors, mass airflow sensors, oxygen sensors, exhaust sensors, engine tachometers, voltmeters, current meters, temperature sensors, fluid level sensors, and the like. The engine sensors 106 can for example provide ground vehicle operating parameters such as current fuel consumption, engine revolutions per minute (RPMs), and the like. The engine controllers 108 can for example control fuel injection parameters in response to throttle control inputs, and the like. The transmission sensors 110 and transmission controllers 112 can include, but not limited to, shift lever position sensors, gear selection sensors, clutch pedal position sensors, Transmission Control Units (TCU), tachometers, temperature sensors, fluid level sensors, hydraulic controllers, servos, and the like. The transmission sensors 110 can for example provide vehicle operating parameters such as transmission RPM, torque, current gear, and the like. The transmission controllers 112 can for example control clutch and shift control inputs and the like. The brake sensors 114 and brake controllers 116 can include, but not limited to, brake pedal position sensors, brake pedal force sensors, hydraulic pressure sensors, air pressure sensors, torque sensors, anti-lock brake system (ABS) controllers, and the like. The steering sensors 118 and steering controllers 120 can include, but not limited to, steering position sensors and the like. The driving environment sensors 104 can include, but not limited to, cameras, radar, inertial measurement units (IMU), global position systems (GPS), light detection and ranging (LIDAR), temperature sensors, dedicated short range communications (DSRC), and the like. The driving environment sensors 104 can for example provide driving environment parameters such as road surface condition, road width, lane markings, traffic control devices, traffic conditions, line of sight, visibility, lighting, current weather, location, and the like. The communication interface 122 can provide for downloading or streaming of two- or three-dimensional map data, current and future weather conditions, traffic conditions, and or the like. Some sensors and controllers can provide and or operate on the same, similar and or overlapping data, functions and the like. In addition, various data and or functions can be combined to increase confidence, increase accuracy, generate additional data, generate higher level functions, and or the like.

Figure 2:
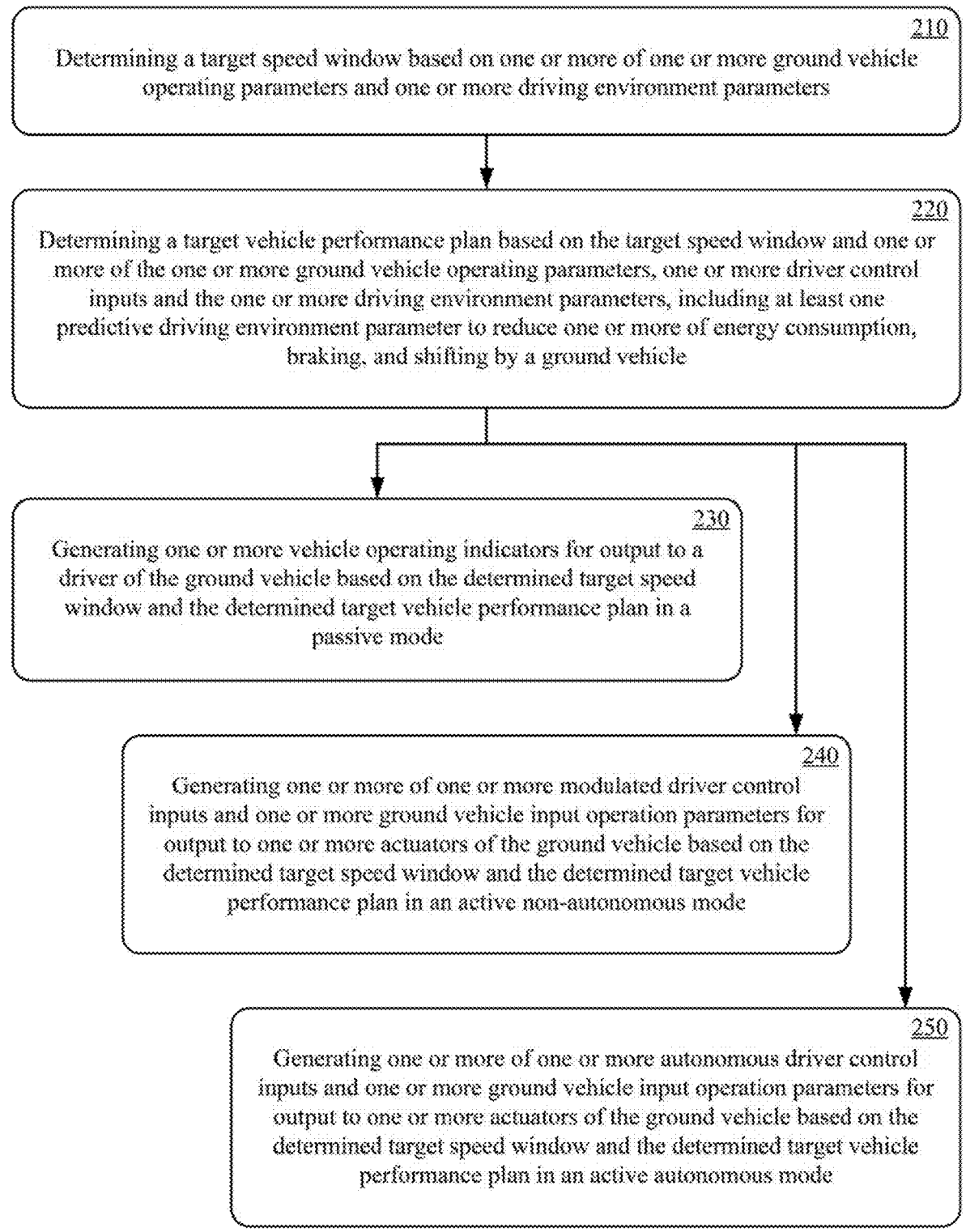
FIG. 2 shows a predictive enhanced cruise control method for use in a ground vehicle, in accordance with aspects of the present technology.

The predictive enhanced cruise controller 102 will be further explained with reference to FIG. 2. The predictive enhanced cruise controller 102 can be configured to determine a target speed window based on one or more of one or more ground vehicle operating parameters and one or more driving environment parameters, at 210. For example, posted speed limits (driving environment parameters) may specify maximum operating speeds on various segment of one or more roadways. The posted speed limits may also specify minimum operating speeds in some cases. The speed limits can, for example, be received from electronic map data sources, images of the roadway captured by cameras on the ground vehicle, or any other data that characterizes the roadway. Similarly, a minimum safe following distance determined from one or more forward looking cameras, LIDAR, radar or the like can be utilized to calculate an average speed for current traffic conditions. Similarly, weather conditions can be utilized by the predictive enhanced cruise controller 102 to calculate a safe speed for road conditions. A maximum speed can also be determined based on road curvature and safe lateral acceleration. An operator, such as the company operating the vehicle, may specify a maximum operating speed. The one or more different specified and or determined speeds can be combined to generate a target speed window.

For example, a posted speed limit, detected by a camera or determined from map data, may specify a maximum speed of 65 miles per hour (MPH) and a minimum speed of 45 MPH. In addition, an ambient outside temperature measured by a temperature sensor on the vehicle and current operation of the windshield wipers may indicate a freezing temperature and precipitation. In such case, the predictive enhanced cruise controller 102 may determine that the maximum safe speed for current road conditions should be limited to 55 MPH, and therefore determine a target speed window of between 45 and 55 MPH. In another example, a posted speed limit may specify a maximum speed of 55 MPH. However, stop and go traffic may be detected by forward looking cameras on the vehicle. The predictive enhanced cruise controller 102 may determine, based upon current minimum safe distance values, that the safe speed for current traffic conditions is between 0 and 25 MPH. Therefore, in the stop and go traffic conditions, the target speed window may be determined to be between 0 and 25 MPH. In yet another example, the posted speed limit for the current and next few segments of an interstate highway may be 55 MPH. However, topographical data for the next segment of roadway may indicate a curve in the road. The topographical data can, for example, be received from electronic map data sources, images of the roadway captured by cameras on the ground vehicle, or any other data that characterizes the roadway. In such case, the predictive enhanced cruise controller 102 may determine a safe speed for the curved segment of the road to be 45 MPH. In addition, based upon a scheduled delivery time and a predicted route, the predictive enhanced cruise controller 102 may determine that the minimum average speed to be 40 MPH. In such case the predictive enhanced cruise controller 102 may determine a target speed window for the segment including the curve to be between 40 and 45 MPH.

At 220, the predictive enhanced cruise controller 102 can further determine an adaptive target vehicle performance plan based on the target speed window and one or more of the one or more ground vehicle operating parameters, one or more driver control inputs and the one or more driving environment parameters. In one implementation, the adaptive target vehicle performance plan can be determined based upon the dynamic load on the powertrain of the ground vehicle. The powertrain load can be determined from one or more ground vehicle operating parameters, driver control inputs and or driving environment parameters including, but not limited to, the ground speed, acceleration, engine torque, engine output power, transmission torque, transmission output power, gear ratio, current fuel consumption rate, roadway geometry, gross vehicle weight, cargo weight, rolling resistance of the vehicle, historical datasets, and the like. The historical datasets can include statistical data captured from different trips along the same or similar road segments, for the same or similar ground vehicles, during the same or similar traffic conditions, during the same or similar weather conditions, and or the like. The powertrain load along with one or more other ground vehicle operating parameters, driver control inputs and or driving environment parameters can be utilized to determine an adaptive target vehicle performance plan as the ground vehicle travels along a current roadway segment and or one or more upcoming roadway segments.

For example, the predictive enhanced cruise controller 102 may determine that the upcoming segment of roadway includes a short flat portion, a steep uphill grade and then continues along another flat grade, from three-dimensional map information. The predictive enhance cruise controller 102 may have also determined a target speed window of 55 to 65 MPH for the upcoming segment. The predictive enhanced cruise controller 102 may therefore generate an adaptive target vehicle performance plan that includes gradually increasing the ground speed of the vehicle from a current speed of 60 to 65 MPH as the vehicle proceeds through the initial flat portion of the segment. The gradual increase in speed along the short flat portion may incur a relatively small increase in fuel consumption, while allowing the vehicle to maintain the higher speed part way up the steep incline. The adaptive target vehicle performance plan may then provide for the vehicle to gradually slow from 65 MPH to 55 MPH as it continues to climb up the steep incline. In contrast, if the ground vehicle tried to maintain a constant speed up the incline, a significant amount of additional fuel would be consumed. Therefore, the adaptive target vehicle performance plan can provide for an overall reduction in fuel consumption by the ground vehicle while maintaining an average speed over the entire segment close to the center of the target speed window. In another example, predictive enhanced cruise controller 102 may determine that the powertrain is nearing an upper end of engine RPM versus fuel efficient curve for a given transmission gear and that a shift to a higher gear ratio should be executed soon. However, from LIDAR sensor data, the predictive enhanced cruise controller 102 may detect that traffic ahead is starting to slow. Therefore, the predictive enhanced cruise controller 102 may update the current adaptive target vehicle performance plan to hold off on the potential gear shift. The current ratio of relatively high engine RPM to torque can instead be utilized to maintain or even slightly slow the speed of the ground vehicle in response to the traffic ahead starting to slow. Avoiding the situation of shifting to a high gear and then shift back down a short period of time later, and vice versa, can reduce overall energy consumption over the course of a trip. Accordingly, by predicting the speed, acceleration, torque, power, braking and the like along an upcoming segment of the roadway, shifting can be reduced which can in turn reduce overall energy consumption. Similarly, predicted speed and gear selection along an upcoming segment of the roadway, can be utilized to reduce braking which can in turn reduce overall energy consumption.

The predictive enhanced cruise controller 102 can further determine the adaptive target vehicle performance plan based on one or more driving risk factors. The one or more driving risk factors can be determined from one or more of one or more of the plurality of ground vehicle operating parameters, driver control input, and or one or more driving environment parameters. The driving risk factors can for example be determined based on current and or future traffic conditions, roadway geometry and or topology, current and or future weather conditions, driver control inputs, driver alertness and readiness levels, location-based accident history data, and or the like. The driving risk factors along with one or more other ground vehicle operating parameters, driver control inputs and or driving environment parameters can be utilized to determine an adaptive target vehicle performance plan as the ground vehicle travels along one or more roadway segments. The driving risk factors may adjust the speed, shifting and or braking of the vehicle over the current and or future roadway segment. For example, when icy conditions are detected the adaptive target vehicle performance plan may provide for a further reduction of the speed of the vehicle around curves, and more gradual acceleration and braking. In another example, the following distance can be increased when the driver attentiveness is determined to be low from an in-cab camera.

The predictive enhanced cruise controller 102 can operate in one or more modes that can include a passive mode, an active non-autonomous mode, an active autonomous mode and or the like. In a passive mode, the predictive enhanced cruise controller 102 can generate one or more vehicle operating indicators for output to a driver of the ground vehicle based on the determined target speed window and the determined adaptive target vehicle performance plan, at 230. The target speed window and adaptive target vehicle performance plan can adjust vehicle operating indicators output to the driver to assist the driver in reducing overall energy consumption, reducing shifting, reducing braking, and or the like to increase performance. For example, audio, visual and or haptic clues can be utilized to indicate to the driver when he or she should shift a manual transmission. The predictive enhanced cruise controller 102 can also provide feedback on how the driver's manual performance compares to the predictive enhanced cruise control. The feedback can be used to train drivers, for logistics, and or the like.

In an active non-autonomous mode, the predictive enhanced cruise controller 102 can generate one or more of one or more modulated driver control inputs and one or more ground vehicle input operation parameters for output to one or more actuators of the ground vehicle based on the determined target speed window, the determined adaptive target vehicle performance plan and one or more driver control inputs, at 240. For example, the determined target speed window may be between 55 and 65 MPH, and the determined adaptive target vehicle performance plan may provide for the actual speed of the vehicle to decrease from 65 to 55 MPH as the vehicle climbs a steep grade in the upcoming segment of the roadway. As the driver operates the ground vehicle, the driver may depress the gas pedal further and further to try and maintain a constant speed of the vehicle as it proceeds up the hill. However, the increase in throttle may simply increase energy consumption without being able to maintain speed up the steep incline. In such case, the predictive enhanced cruise controller 102 can modify the throttle input determined from the gas pedal control input by the driver based on the determined target vehicle performance plan. As a result, the increasing throttle input by the driver can be modified to provide a decreasing throttle input to provide for the vehicle to slow from 65 to 55 MPH as the ground vehicle climbs the steep grade to decrease overall energy consumption.

In an active autonomous mode, the predictive enhanced cruise controller 202 can generate one or more of one or more autonomous driver control inputs and one or more ground vehicle input operation parameters for output to one or more actuators of the ground vehicle based on the determined target speed window and the determined adaptive target vehicle performance plan, at 250. For example, the predictive enhanced cruise controller 102 can control throttle inputs to the engine controller, synchronize engine and transmission speeds, and control shifting operations through the transmission controller. The predictive enhanced cruise controller 120 can also control braking and steering to autonomously control operation of the ground vehicle in accordance with the determined target speed window and adaptive target vehicle performance plan.

In addition, different driver control inputs and or ground vehicle input operation parameters can be generated as indicators, modulate inputs, or autonomous control inputs. For example, the predictive enhanced cruise controller 102 can generate one or more steering operation indicators for presentation as audio, visual and or haptic clues. However, the predictive enhanced cruise controller 102 can determine the smoothness of a road surface from a camera and generate an autonomous ground vehicle input operation parameter that controls the height of the ground vehicle. In such case, the suspension height of the ground vehicle can be automatically lowered to reduce airflow underneath the vehicle, thereby reducing the aerodynamic drag forces and increase energy efficiency when the roadway is smooth.

Machine learning can be utilized to configured and optimize the predictive enhanced cruise controller 102. In one implementation, reinforcement learning techniques can be utilized in the predictive enhanced cruise controller 102. In reinforcement learning, given a state of an environment, an agent takes an action and observes a reward returned by the environment. Given the observation, action and resulting reward tuple, the agent adapts its action policy given similar states (i.e. learns how to act) such that it increases an expected future reward returned by the environment. The process is iteratively performed until the agent takes actions which yield maximal rewards from the environment. The various sensors and controllers 104-122 are representative of a ground vehicle environment. The output of the sensors can represent the state of the ground vehicle operating environment, and the inputs to the controllers represent the actions for a current state of the ground vehicle operating environment. The one or more predictive enhanced cruise controllers 102 can include one or more reinforcement learning (RL) controllers 126. The one or more RL controllers 126 can be configured to receive states of the ground vehicle environment from the sensors 104, 106, 110, 114, 118, 122, and output actions to be performed by the controller 108, 112, 116, 120 on the ground vehicle environment.

Figure 3:
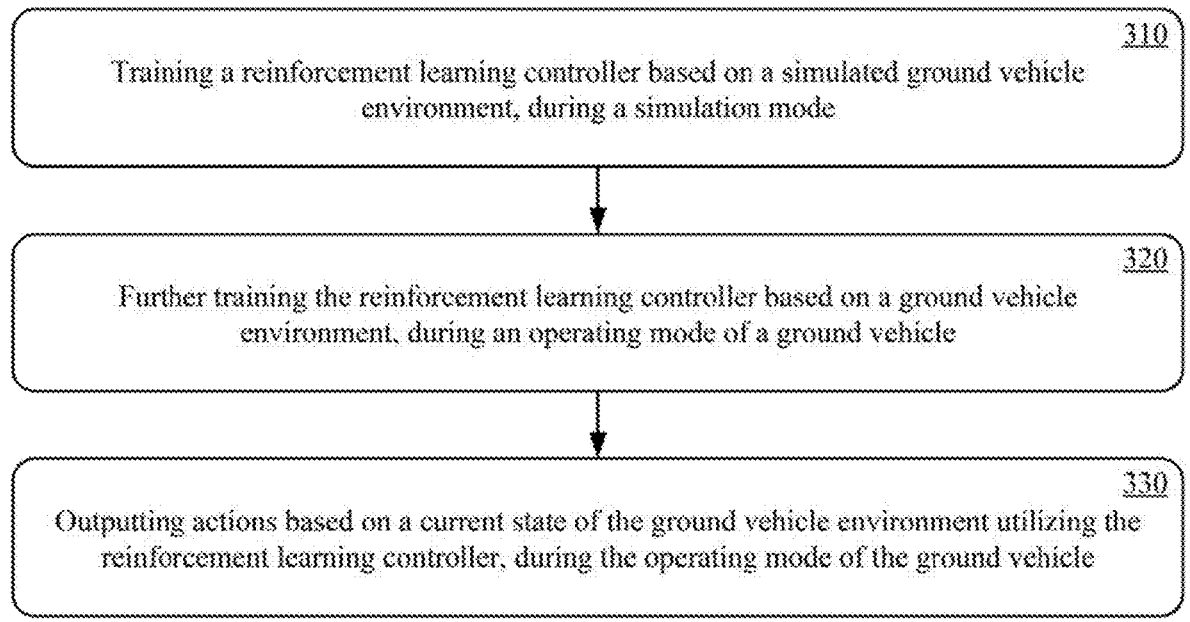
FIG. 3 shows a ground vehicle control learning method, in accordance with aspects of the present technology.

The RL controller 124 can include an action-value function (Q) engine 126, a policy (π) engine 128 and an optimizer engine 130. The operation of the RL controller will be further described with reference to FIG. 3, which shows a ground vehicle control learning method. The ground vehicle control learning method, in one implementation, can include a simulation based training mode and an operating based training mode. The simulated environment includes training data that mimics the ground vehicle operating parameters, driver control inputs and outputs, driving environment parameters and the like. In the simulation mode, a RL controller 124 can be trained based on a simulated ground vehicle environment, at 310. During the simulation mode, the optimization engine 130 monitors action produced by the policy (π) engine 128 and the resulting states including composite states received at the action-value function (Q) engine 126. The optimization engine 130 can optimize the policy (π) engine 128 and the action-value function (Q) engine 126 without knowledge of a model of the environment. At 320, the RL controller 126 can be further trained based on a ground vehicle environment, during an operating mode of the ground vehicle. During the operating mode, the optimization engine 130 monitors actions produced by the policy (π) engine 128, the resulting states including composite states received at the action-value function (Q) engine 126 and the rewards returned by the environment. The policy (π) engine 128 and the action-value function (Q) engine 126 can be optimized by the optimization engine 130 during the operating mode to account for discrepancies between the simulated optimization and the real world environment of the ground vehicle, as well as the discrepancies in the underlying environment statistics (Markov Decision Process) in the real world environment. At 330, one or more actions determined by the RL controller 125 based on a current state of the ground vehicle environment can be output, during the operating mode of the ground vehicle. The output actions can control operation of one or more ground vehicle subsystems, including the engine, transmission, steering and braking or the like, through one or more of the engine controllers 108, transmission controllers 112, brake controllers 116, steering controllers 120 and the like. The output actions, at 330, and resulting state changes can be utilized to continuously train the RL controller 124, at 320.

Figure 4:
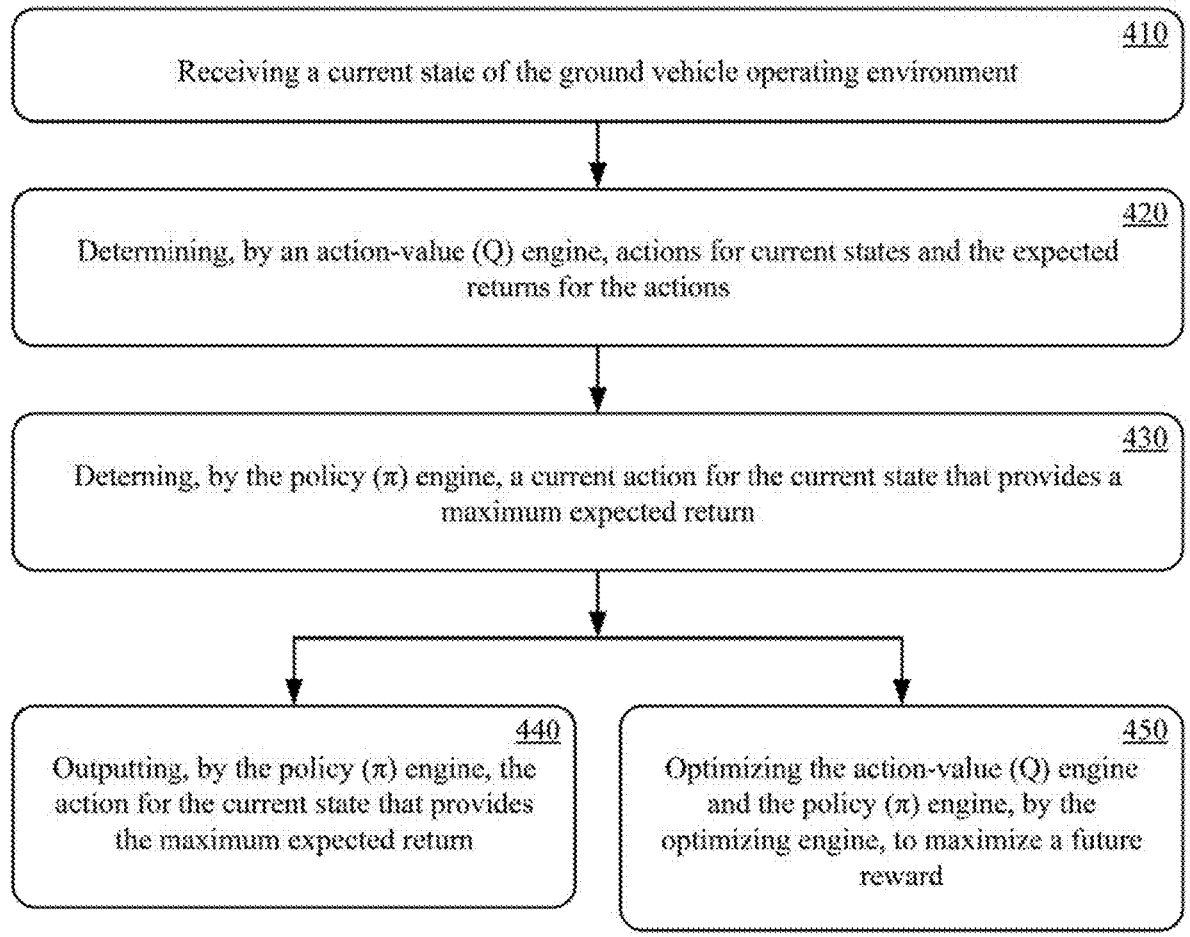
FIG. 4 shows a method of training a reinforcement learning controller, in accordance with aspects of the present technology.

Referring now to FIG. 4, a method of training the RL controller, in accordance with aspects of the present technology, is shown. Training the RL controller 124 can include receiving a current state of the ground vehicle operating environment, at 410. At 420, the action-value function (Q) engine 126 can determine actions for the current state and expected returns for the actions. At 430, the policy (π) engine 128 can determine an action for the current state that provides a maximum expected return. At 440, the policy (π) engine 128 can output the action for the current state that provides the maximum expected return. The optimization engine 130 can optimize the action-value function (Q) engine 126 and the policy (π) engine 128 to maximize an expected future reward. The method of training the RL controller 124 can be utilized in both the simulation mode and the operating mode of the ground vehicle.

Figure 5:
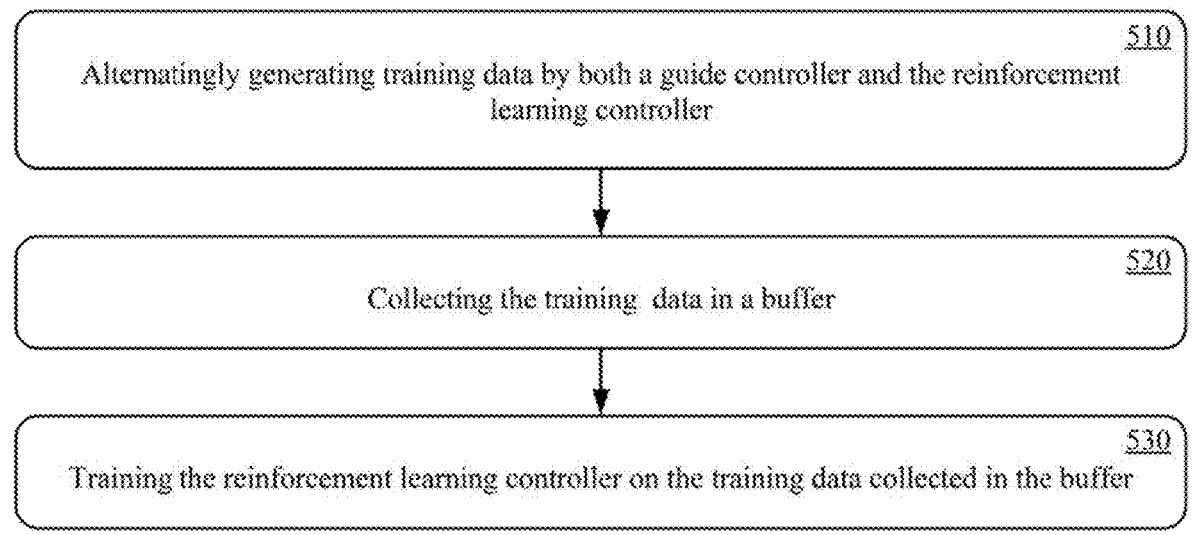
FIG. 5 shows a ground vehicle control learning method, in accordance with another aspect of the present technology.
Figure 6:
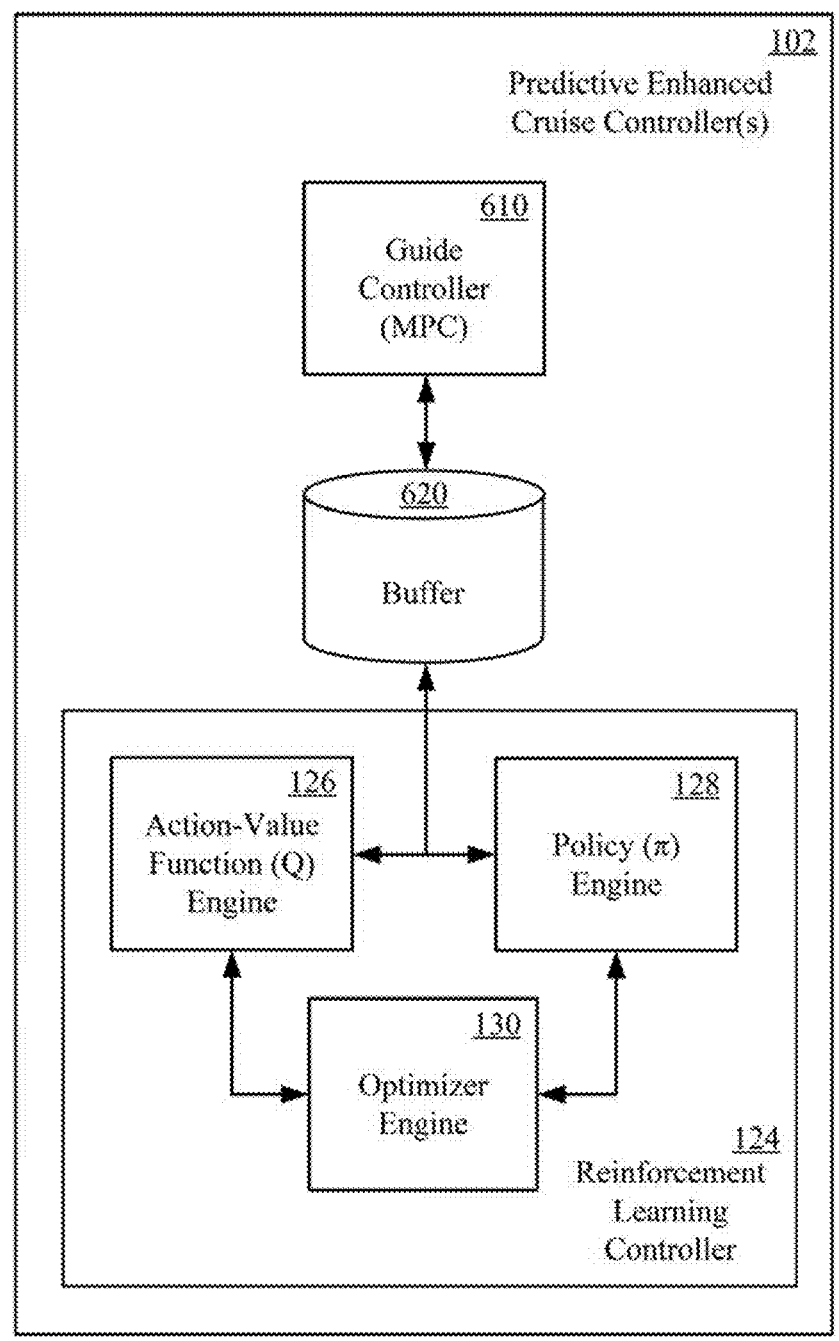
FIG. 6 shows a predictive enhanced cruise controller, in accordance with another aspect of the present technology.

Referring now to FIG. 5, a ground vehicle control learning method, in accordance with another aspect of the present technology, is shown. The ground vehicle control learning method will be further described with reference to FIG. 6, which shows a predictive enhanced cruise controller, in accordance with another aspect of the present technology. As illustrated in FIG. 6, the predictive enhanced cruise controller 102 can include the guide controller 124, a guide controller 610 and a buffer 620. When the RI, controller 124 and the guide controller 610 are generating training data they can be considered to be behavioral controllers. When the RL controller 124 is being trained, the RL controller 124 can be considered to be a target controller. In one implementation, the guide controller 610 can be a model predictive controller (MPC). During the simulation mode, the ground vehicle control learning method can include alternating generating training data by both the guide controller 610 and the RL controller 124 as behavioral controllers, at 510. For example, the guide controller 610 can perform a simulation to generate a first set of training data. The RL controller 120 can then perform a simulation to generate a second set of training data. The guide controller 610 can perform a simulation to generate a third set of training data, and so on. The simulation generated by the guide controller 610 and the RL controller 120, as behavioral controllers, can be used for off-policy training of the RL controller 124, as the target controller. In other implementations, the guide controller 610 and the RL controller 124, as behavioral controllers, can generate sets of training data in various alternating sequences. For instance, the guide controller 610 can generate one or more sets of training data, and then the RI, controller 124 can generate one or more sets of training data. At 520, the training data generated by both the guide controller 610 and the action-value function (Q) engine 126, the policy (π) engine 128 and the optimizer engine 130 of the RL controller 124 can be collected in the buffer 620, at 520. The training data collected in the buffer 620 can include states, actions and rewards. At 530, the RL controller 124, as the target controller, can be trained on the training data collected in the buffer. The RL controller 124 can be optimized for energy efficiency, driveability costs, and the like based on the buffered data.

Optionally or alternatively, the RL controller 124, as the target controller, can be trained using initial training data generated by the guide controller 610, as the behavioral controller, during the simulation mode. The use of the guide controller 610 can provide for training the action-value function (Q) engine 126, the policy (π) engine 128 and the optimizer engine 130 of the RL controller 124 utilizing training data in stable environment regions. In other implementations, simulations can be run utilizing the RL controller 124, as the behavior controller, to generate off policy training data.

Figure 7:
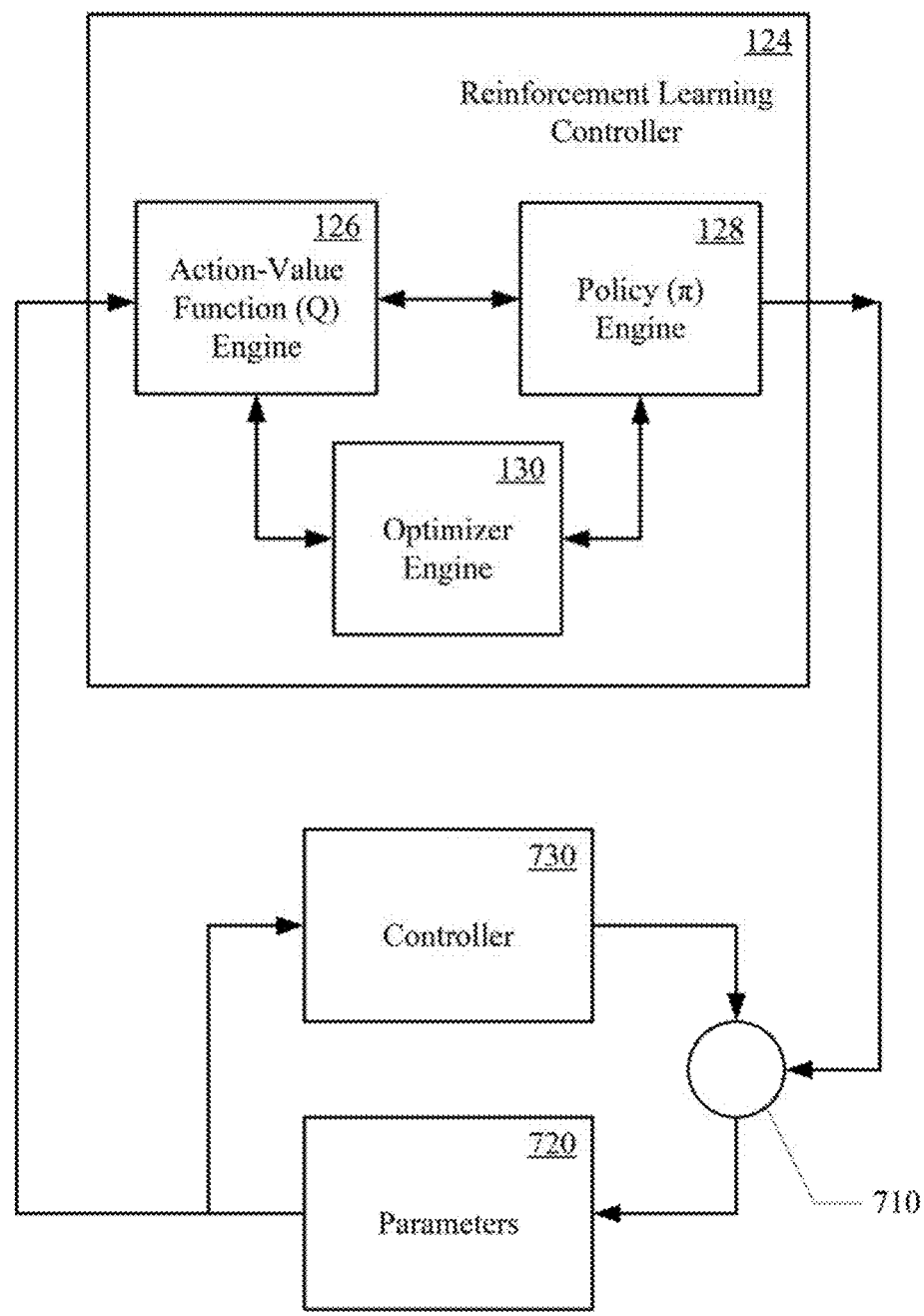
FIG. 7 shows a ground vehicle control learning method, in accordance with another aspect of the present technology.

Referring now to FIG. 7, a ground vehicle control learning method, in accordance with another aspect of the present technology, is shown. During the operating mode, training the RL controller can include modifying 710 one or more parameters 720 of a controller 730 of the ground vehicle environment. The modified parameters can be utilized for optimization the controller of the ground vehicle environment 730 and can be utilized for training the RL controller 124. The controller of the ground vehicle environment 730 can be any controller of the ground vehicle such as, but not limited to, one or more engine controllers 108, one or more transmission controllers 112, one or more brake controllers 116, one or more steering controllers 120 and or the like. The one or more parameters can include, but not limited to, ground vehicle operating parameters, driver control inputs, driving environment parameters and or the like. In this implementation, from point of view of the RL controller 120, the controller of the ground vehicle environment 730 becomes part of the environment.

In another implementation, the controller of the ground vehicle environment 730 can be configured as a parametrized function $f_{i(|\theta_i)}$, s.t. $f_i \in \mathcal{F}$, where $\mathcal{F}$ is a family of controllers and $\theta \in \mathbb{R}^K$. This becomes the action of a reinforcement learning policy, which by acting selects a new function $f_1$ since $f_i$ is parameterized by $\theta_i$. The RL controller 124 can learn to select a particular function $f_i$ by defining its action $\theta_i \sim \pi(\theta|x_i)$, wherein "~" means sampled for a stochastic policy, and wherein if the policy is deterministic "~" becomes "="). The RL controller 124, as a target controller, can be optimized according to some criterion, such as a loss function.

In another implementation, a Lyapunov function of the longitudinal vehicle dynamics can be used to derive constraints on control commands that ensure that the RL controller 124, as a target controller, yields a stable behavior. A simplified vehicle longitudinal model can be expressed according to Equation 1:

$$\dot{v}_x = -k_1 v_x^2 - k_2 v_x + k_3 T_d - k_4 \cos\phi + k_5 g \sin\phi k_5 + g \sin\phi \quad (1)$$

wherein $T_d = r_g r_d T_e - T_d$

The Lyapunov function can be formulated as if $v_x > v_{max}$ then $J_1 = c(v_x - v_{max})^2$ if $v_x < v_{max}$ then $J_2 = c(v_x - v_{min})^2$ where c>0 is a tunable parameter.

Figure 8:
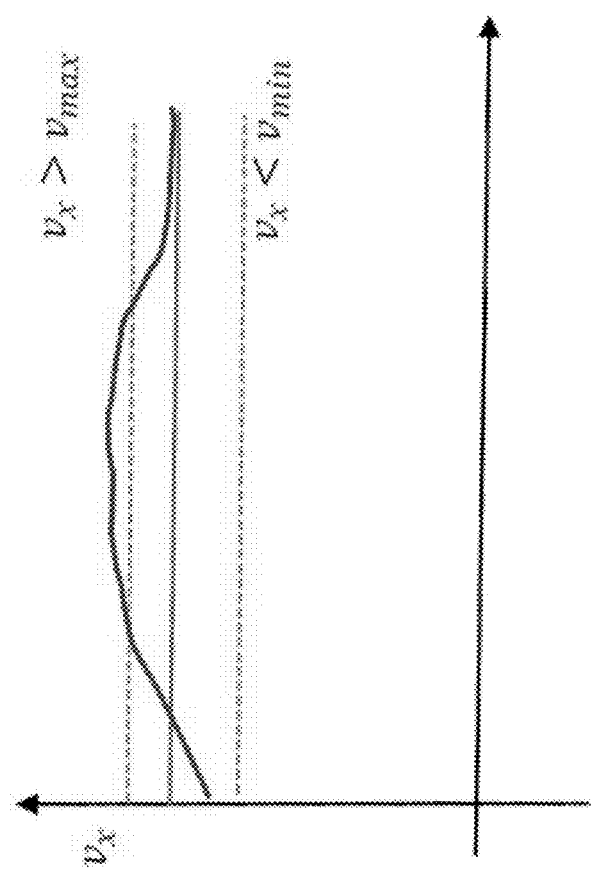
FIG. 8 shows a Lyapunov function, in accordance with aspects of the present technology.

Imposing the following constraints, that were derived on the requirement that the derivative of Lyapunov functions with respect to time shall be negative definite, will ensure stable operation of the vehicle when being controlled by the RL controller 124 according to:

if $v_x > v_{max}$ then $T_d < \frac{K_1}{K_3} v_x^2 + \frac{K_2}{K_3} v_x + \frac{K_4}{K_3} \cos\phi - \frac{K_5}{K_3} - \frac{g}{k_3} \sin\phi$ if $v_x < v_{min}$ then $T_d < \frac{K_1}{K_3} v_x^2 + \frac{K_2}{K_3} v_x + \frac{K_4}{K_3} \cos\phi - \frac{K_5}{K_3} - \frac{g}{k_3} \sin\phi$ and illustrated in FIG. 8.

Figure 9A:
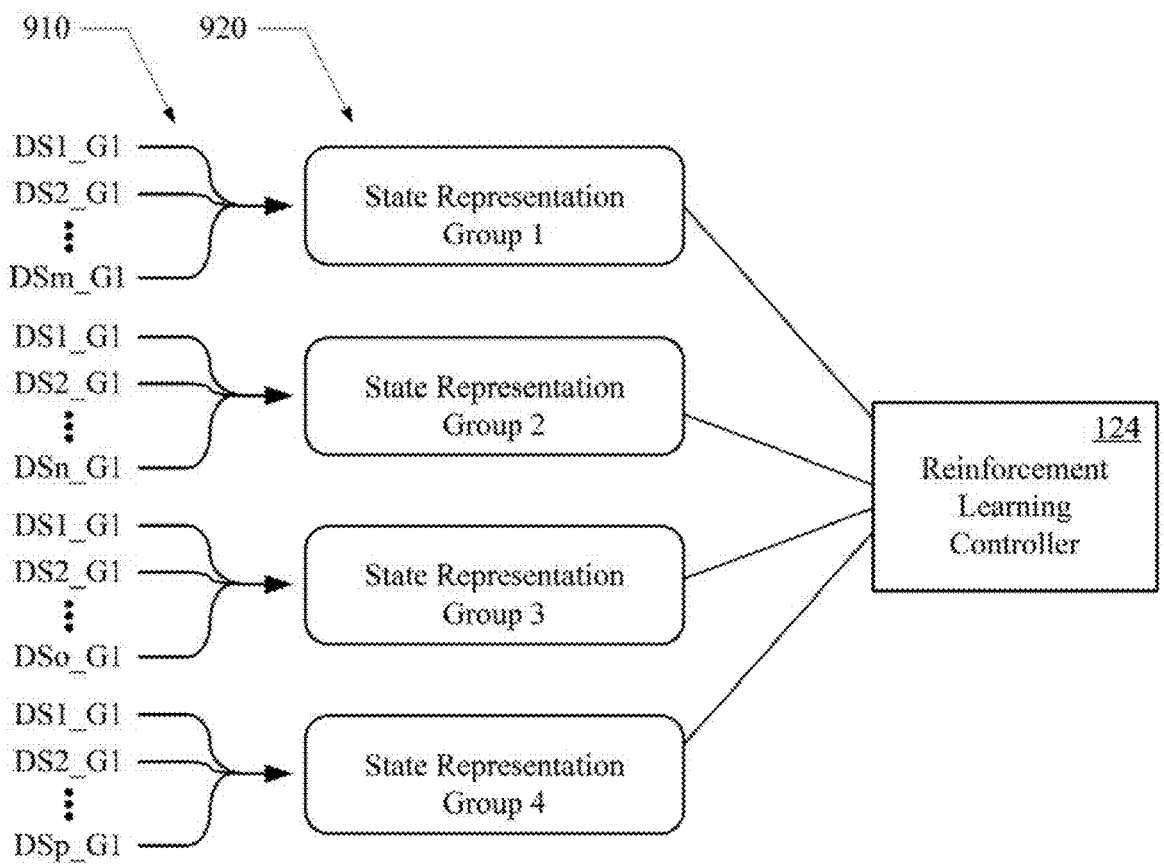
FIGS. 9A and 9B shows a method decoupling the reinforcement learning controller from a data source configuration, in accordance with aspects of the present technology.
Figure 9B:
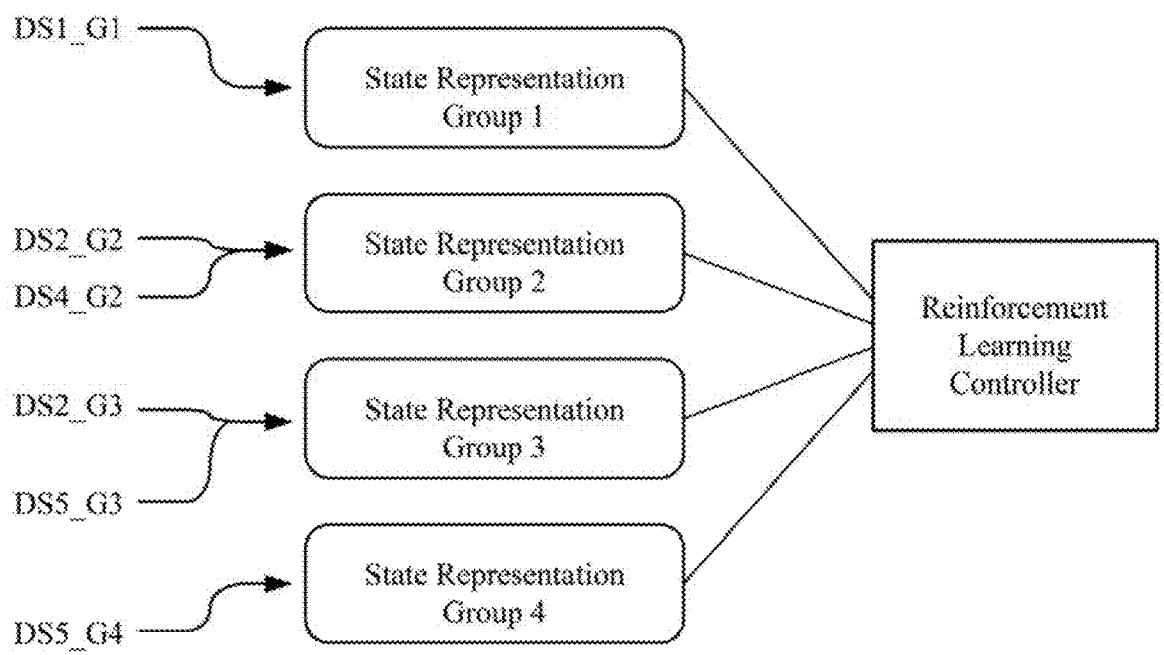
Figure 10A:
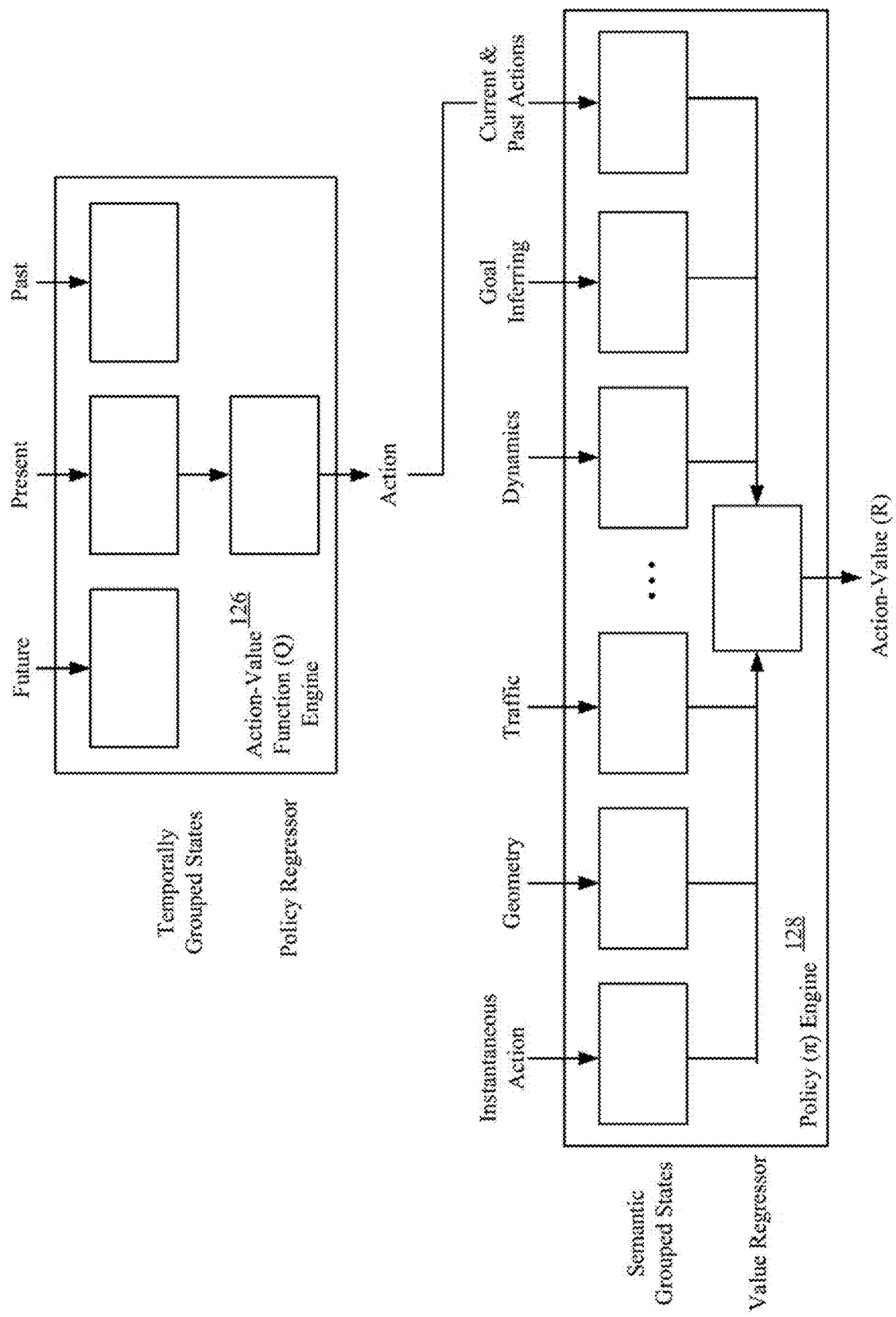
FIGS. 10A and 10B show a method decoupling the reinforcement learning controller from a data source configuration, in accordance with aspects of the present technology.
Figure 10B:
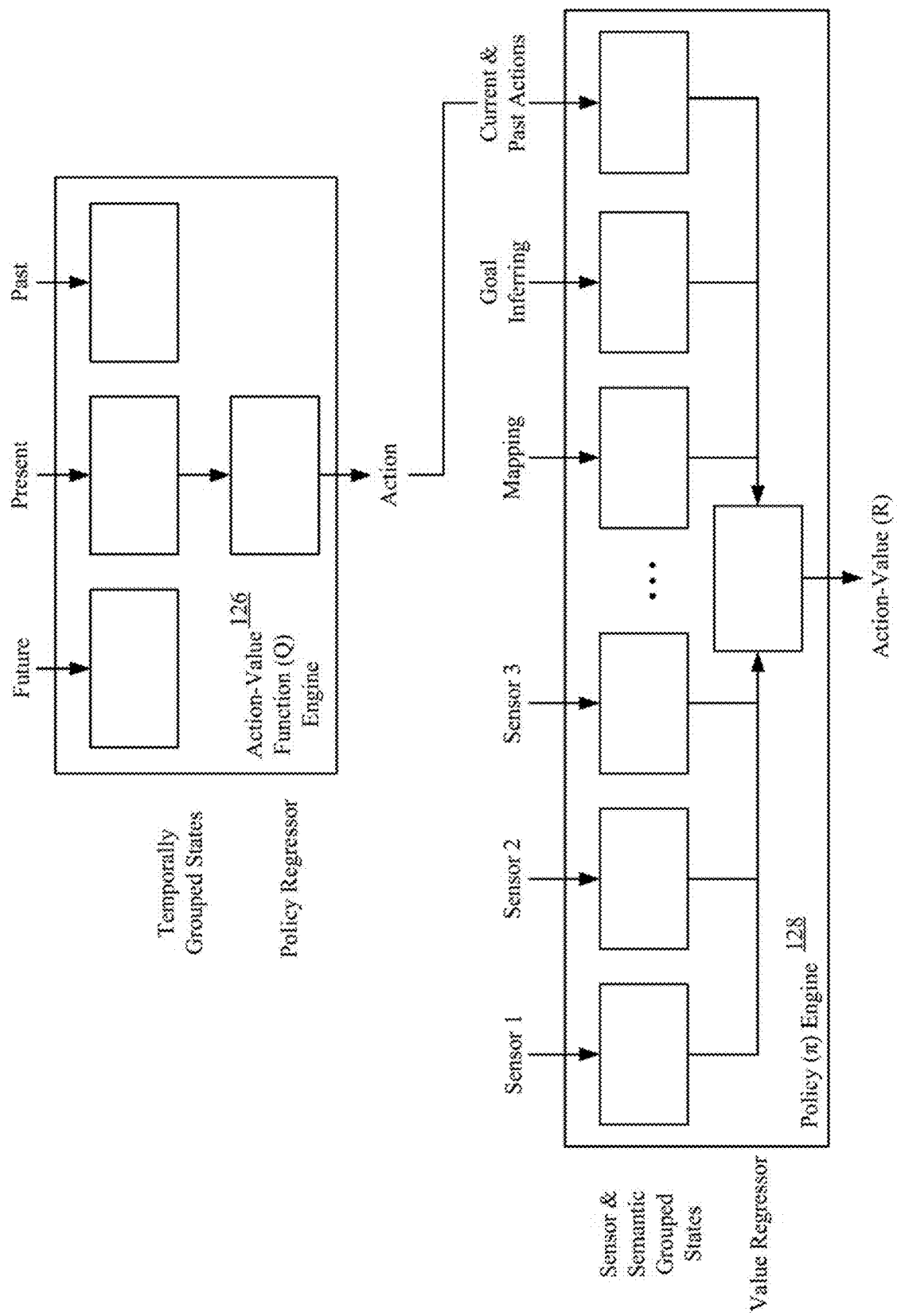
Figure 11:
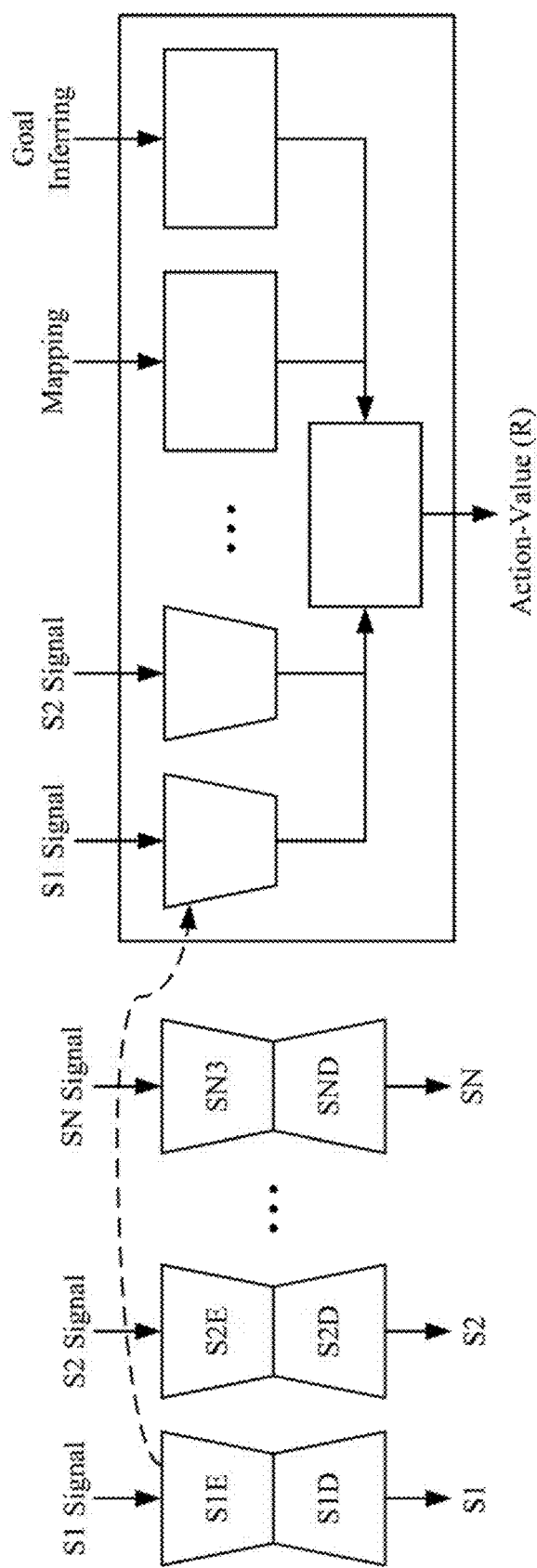
FIG. 11 shows a method decoupling the reinforcement learning controller from a data source configuration, in accordance with aspects of the present technology.

Referring now to FIGS. 9A 9B, 10A and 10B, a method decoupling the RL controller 124 from a data source configuration, in accordance with aspects of the present technology, is shown. The RL controller 124 can receive data from various sources 910. The data sources 910 can be grouped 920 into semantically similar data source group, temporal grouped states, and or the like. A state representation can be extracted for each data source group 920. The state representation can be considered a compressed representation. For example, a set of various sensors may capture roadway geometry state information. A set of sensors can include a map application DS1_G1, a right-side forward-looking camera DS2_G1 and a left-side forward-looking camera, and a GPS receiver DSm-G1 can be provide semantically similar roadway geometry state information. The semantically similar roadway geometry sensors can be identified and grouped together utilizing a feature extractor. A state representation of the roadway geometry can be extracted by the feature extractor from the set of semantically similar sensors. The RL controller 124 can be trained on state representations inferred from the grouped sensory data as illustrated in FIG. 9A. During initial training the full set of sensor data can be used to extract maximal state representation. Using the reduced sensor set, a new feature extractor can be learned to reconstruct grouped state representation learned using the full set of sensors, as illustrated in FIG. 9B. For example, a given ground vehicle utilize the map application DS1_G1, but may not have the right- and left-side forward-looking cameras or the GPS receiver. A feature extractor can extract the roadway geometry state information from the map application. The RL controller 124 can continue to train on and control the operation of the ground vehicle using the roadway geometry state information even though the mix of sensors have changed. Accordingly, the trained RL controller 124 can advantageously be reused for implementations with differing data sources implementation, with minimal additional training for the given set of data sources. In one implementation, all the data sources can be grouped into semantically similar data source groups and used in the training of the action-value function (Q) engine 126 and the policy ($\pi$) engine 128, as illustrated in FIG. 10A. In another implementation, some sources can be grouped into semantically similar data source groups. A mix of individual sources and the grouped data sources can be used in the training of the action-value function (Q) engine 126 and the policy ($\pi$) engine 128, as illustrated in FIG. 10B.

Dimensionalty reduction techniques can be used to extract grouped state representation. In one implementation denoising or signal reconstruction auto-encoders can be used. The encoder can take one or more data sources and reconstruct a particular data source. The learned states can then be used to learn new feature extractors from a reduced set of data signal groups which target learned state representations. Thus, by learning state representation once and optimizing the controller once using the states, only new feature extraction need to be learned to accommodate different product configurations.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   training a reinforcement learning controller based on alternating behavior training data and target training data for a simulated ground vehicle environment, during a simulation mode;
   further training the simulation trained reinforcement learning controller based on a ground vehicle environment, during an operating mode of a ground vehicle; and
   outputting an action based on a current state of the ground vehicle environment utilizing the simulation and environment trained reinforcement learning controller, during the operating mode of the ground vehicle.

2. The method according to claim 1, wherein training the reinforcement learning controller includes:
   optimizing the reinforcement learning controller for composite energy efficiency and drivability costs.

3. The method according to claim 1, wherein training the reinforcement learning controller, during the simulation mode, includes:
   alternatingly generating the behavioral training data by both a guide controller and the reinforcement learning controller, wherein the guide controller generates the training data to be used for off-policy training of the reinforcement learning controller under a model-free reinforcement learning policy or an actor-critic model free reinforcement learning setting;
   collecting the training data in a buffer; and
   training the reinforcement learning controller on the training data collected in the buffer.

4. The method according to claim 3, wherein training the reinforcement learning controller, during the simulation mode, includes:
   running simulation using the guide controller to generate initial training data to be used for off-policy training of the reinforcement learning controller under a model-free reinforcement learning policy.

5. The method according to claim 3, wherein training the model-free reinforcement learning policy, during the simulation mode, includes:
   intermittently running simulations utilizing a behavioral model-free reinforcement learning policy to generate off-policy training data.

6. The method according to claim 3, wherein training the model-free reinforcement learning policy, during the simulation mode, includes:
   running simulation utilizing a guiding stable policy to generate training episode data, wherein the model-free reinforcement learning policy is trained in a stable environment region.

7. The method according to claim 1, wherein further training the simulation trained reinforcement learning controller, during the operating mode, includes:
   training the reinforcement learning controller including modifying one or more parameters of a controller of the ground vehicle environment, wherein the one or more modified parameters are utilized by the controller of the ground vehicle environment and the reinforcement learning controller.

8. The method according to claim 1, wherein training the reinforcement learning controller comprises iteratively:
   receiving a current state;
   determining an action-value function associating a return to a given state and action pairing based on the current state received in response to a previous action; and
   updating a policy with an action value function providing a best return for a given state and action pairing.

9. The method according to claim 8, wherein:
   states include one or more of a group consisting of a plurality of powertrain operating parameter states, and a plurality of driving environment input states;
   actions include one or more of a group consisting of a plurality of powertrain operating parameter actions, and a plurality of driver control input actions.

10. The method according to claim 1, further comprising decoupling the reinforcement learning controller from data sources.

11. The method according to claim 10, decoupling the reinforcement learning controller from data sources includes:
   grouping similar data sources into a plurality of groupings, each grouping capturing a different state symantec.

12. A ground vehicle control system comprising:
   a plurality of sensors configured to detect a plurality of ground vehicle operating parameters, driver control inputs, and one or more driving environment parameters, wherein the one or more driving environment parameters includes at least one predicted driving environment parameter; and
   a predictive enhanced cruise controller including a reinforcement learning controller configured to;
      train the reinforcement learning controller based on alternating behavior training data and target training data for a simulated ground vehicle environment, during a simulation mode;
      further train the simulation trained reinforcement learning controller based on a ground vehicle environment, during an operating mode of a ground vehicle; and
      output an action based on a current state of the ground vehicle environment utilizing the simulation and environment trained reinforcement learning controller, during the operating mode of the ground vehicle.

13. The ground vehicle control system of claim 12, wherein the reinforcement learning controller is further configured to;
   optimize the reinforcement learning controller for composite energy efficiency and drivability costs.

14. The ground vehicle control system of claim 12, wherein the reinforcement learning controller is further configured to;
   alternatingly generate the behavioral training data by both a guide controller and the reinforcement learning controller;
   collect the training data in a buffer; and
   train the reinforcement learning controller on the training data collected in the buffer.

15. The ground vehicle control system of claim 12, wherein the reinforcement learning controller is further configured to;
   generate initial training data by the guide controller; and
   train by the reinforcement controller on the initial training data.

16. The ground vehicle control system of claim 12, wherein the reinforcement learning controller is further configured to;

train the reinforcement learning controller, wherein an output of the reinforcement learning controller modifies one or more outputs of a controller of the ground vehicle environment.

17. The ground vehicle control system of claim 12, wherein the reinforcement learning controller includes:
an action-value (Q) function engine configured to receive a current state of the ground vehicle operating environment and determine actions and expected returns for the actions;
a policy ($\pi$) engine configure to determine a current action for the current state that provides a maximum expected return and output the determined current action;
an optimizer engine configured to optimize the functions of the actions and expected returns of the action-value (Q) function engine and the current action for the current state that provide the best return of the policy ($\pi$) engine, wherein the best return is a composite of energy efficiency, powertrain control and drivability functions.

18. The ground vehicle control system of claim 12, wherein:
states include one or more of a group consisting of a plurality of powertrain operating parameter states, and a plurality of driving environment input states;
actions include one or more of a group consisting of a plurality of powertrain operating parameter actions, and a plurality of driver control input actions.

19. The ground vehicle control system of claim 12, wherein the reinforcement learning controller is further configured to;
decouple the reinforcement learning controller from data sources.

20. The ground vehicle control system of claim 19, wherein the reinforcement learning controller groups similar data sources into a plurality of groupings, each grouping capturing a different state symantec.

* * * * *